US012060011B2

(12) United States Patent
Friebe et al.

(10) Patent No.: US 12,060,011 B2
(45) Date of Patent: Aug. 13, 2024

(54) METHOD AND DEVICE FOR DISPLAYING VEHICLE SURROUNDINGS

(71) Applicant: Continental Automotive GmbH, Hannover (DE)

(72) Inventors: Markus Friebe, Gefrees (DE); Sukumar Srikanth, Bangalore (IN)

(73) Assignee: Continental Automotive GmbH, Hannover (DE)

( * ) Notice: Subject to any disclaimer, the term of this patent is extended or adjusted under 35 U.S.C. 154(b) by 810 days.

(21) Appl. No.: 17/057,241

(22) PCT Filed: May 16, 2019

(86) PCT No.: PCT/DE2019/200044
§ 371 (c)(1),
(2) Date: Nov. 20, 2020

(87) PCT Pub. No.: WO2019/223840
PCT Pub. Date: Nov. 28, 2019

(65) Prior Publication Data
US 2021/0162923 A1    Jun. 3, 2021

(30) Foreign Application Priority Data
May 22, 2018   (DE) ...................... 10 2018 207 976.5

(51) Int. Cl.
*B60R 1/27*   (2022.01)
(52) U.S. Cl.
CPC .......... *B60R 1/27* (2022.01); *B60R 2300/105* (2013.01); *B60R 2300/303* (2013.01); *B60R 2300/802* (2013.01)
(58) Field of Classification Search
CPC ................ B60R 1/00; B60R 2300/105; B60R 2300/303; B60R 2300/802;
(Continued)

(56) References Cited

U.S. PATENT DOCUMENTS 10,902,622 B2   1/2021   Friebe et al.
10,937,201 B2   3/2021   Arbeiter et al.
(Continued)

FOREIGN PATENT DOCUMENTS

DE   102010010906       1/2011
DE   102016220651 A1    4/2018
(Continued)

OTHER PUBLICATIONS

Shaosheng Dai "Algorithm of Blind Pixels Detection for IRFPA Based on Integration Time Adjustment" Published by Atlantis Press on Nov. 2013 (Year: 2013).*

(Continued)

*Primary Examiner* — Anne Marie Antonucci
*Assistant Examiner* — Lidia Kwiatkowska
(74) *Attorney, Agent, or Firm* — Buchanan, Ingersoll & Rooney PC

(57) ABSTRACT

A device and a method for displaying vehicle surroundings in a vehicle during an instantaneous second time point are provided. The method includes providing a first blind area image that contains an image synthesis of a blind area of the vehicle surroundings at a first time point preceding the second time point, arranging each first blind area pixel of the blind area in a new position estimated for the second time point, determining whether the new position of each first blind area pixel at the second time point still lies within the blind area, and producing a respective second blind area pixel for the second time point by synthesizing each first blind area pixel on the basis of motion data of the vehicle if the new position is determined to lie within the blind area.

10 Claims, 3 Drawing Sheets

Figure 1:
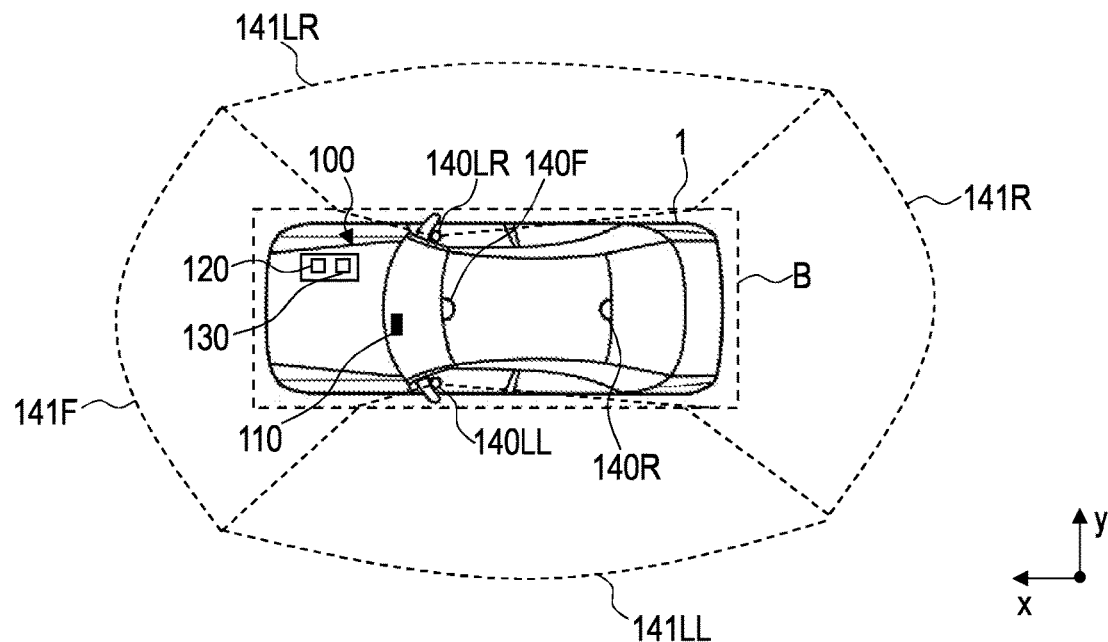

(58) Field of Classification Search
CPC ... B60R 2300/607; B60R 11/04; B60K 35/00; B60K 2370/152; B60K 2370/176; B60K 2370/21
See application file for complete search history.

(56) References Cited

U.S. PATENT DOCUMENTS

| | | | |
|---|---|---|---|
| 11,364,901 B2* | 6/2022 | Nguyen Van | B60W 30/0956 |
| 2010/0201818 A1 | 8/2010 | Imanishi et al. | |
| 2013/0300872 A1* | 11/2013 | Park | G08G 1/167 348/148 |
| 2016/0207459 A1 | 7/2016 | Niem et al. | |
| 2018/0066941 A1* | 3/2018 | Kubota | H04N 7/181 |

FOREIGN PATENT DOCUMENTS

| | | |
|---|---|---|
| DE | 102016223391 A1 | 5/2018 |
| JP | 2006311151 A | 11/2006 |
| JP | 2015171106 A | 9/2015 |

OTHER PUBLICATIONS

Japanese Notice of Reasons for Refusal for Japanese Application No. 2020-562169, dated Jun. 28, 2023 with translation, 5 pages.
English translation of the International Search Report of the International Searching Authority for International Application PCT/DE2019/200044, mailed Jul. 10, 2019, 2 pages, European Patent Office, HV Rijswijk, Netherlands.
PCT International Preliminary Report on Patentability including English Translation of PCT Written Opinion of the International Searching Authority for International Application PCT/DE2019/200044, issued Nov. 24, 2020, 7 pages, International Bureau of WIPO, Geneva, Switzerland.
Korean Request for the Submission of an Opinion for Korean Application No. 10-2020-7030491, dated Aug. 28, 2023 with translation, 11 pages.

* cited by examiner

METHOD AND DEVICE FOR DISPLAYING VEHICLE SURROUNDINGS

The invention relates to a method and a device for displaying vehicle surroundings in a vehicle during an instantaneous time point.

A vehicle can have a driving assistance system which displays or respectively reproduces the vehicle surroundings for a vehicle passenger in the interior of the vehicle on a display apparatus, such as a screen. Such a driving assistance system can also be referred to as a surround view system and usually has one or more vehicle cameras which are mounted on the vehicle and have different fields of view or respectively make possible viewing angles.

Although multiple fields of view are detected by the different vehicle cameras, there remains at least one blind area, also referred to as a blind spot, which lies outside of all of the fields of view and is therefore not contained in the camera images. An example of such a blind area is a ground level which is being driven over by the vehicle in the observed moment and is thus concealed. This is because the various vehicle cameras are usually arranged e.g. on the vehicle front, the rear of the vehicle and the vehicle sides and look out from there, such that the ground level is constantly concealed by the vehicle itself or respectively its body. Therefore, this region is mostly omitted in the display and occupied, for example, by a place holder. Not only is this place holder visually unappealing, but it can also be irritating for the vehicle passenger.

It is therefore an object of the invention to make it possible to improve the way the vehicle surroundings are displayed in a vehicle.

This object is achieved by the subject-matter of the independent claims. Advantageous embodiments and further developments of the invention are indicated in the dependent claims, the description and the accompanying figures.

A first aspect of the invention relates to a method for displaying vehicle surroundings in a vehicle during an instantaneous second time point. The instantaneous time point can be understood to mean that the vehicle surroundings are substantially displayed in real time during the vehicle operation. The vehicle can move in any direction at a vehicle speed which can be determined e.g. from odometry data, wherein the real time display is effected with a suitable image refresh rate.

The method according to the invention provides the following steps:

A first blind area image, e.g. a synthesized or respectively rendered image, having a plurality of blind area pixels is first provided, which contains an image synthesis, e.g. a rendering, of a blind area of the vehicle surroundings, which blind area is arranged outside of a field of view of a vehicle camera, at a first time point preceding the second time point. That is to say that the first time point therefore lies temporally before the observed instantaneous second time point.

Each first blind area pixel of the blind area is then arranged in, e.g. transformed into, a new position estimated, e.g. predicted, for the second time point. This means that the blind area image has a multiplicity of blind area pixels which are arranged from their old position, as contained in the blind area image, in their new position based on an estimation, prediction, transformation, interpolation or similar. Instead of a respective individual blind area pixel, a combination of blind area pixels can also be enlisted, in order to thereby reduce any aliasing effects.

It is then determined whether the new position of each first blind area pixel at the second time point still lies within the blind area. Due to the vehicle motion, the observed, newly arranged blind area pixel could now also lie outside of the blind area.

A respective second blind area pixel, e.g. a rendered pixel, is then produced, e.g. synthesized, rendered, etc. for the second time point by synthesizing each first blind area pixel on the basis of motion data of the vehicle in a motion-compensated form if the new position is determined to lie within the blind area. Since the vehicle can continue moving from blind area image to blind area image as it is driving, the blind area pixel can likewise alter its position so that the motion data of the vehicle are taken into consideration in order to produce the second blind area pixel. If the vehicle is not moving, the second blind area pixel can correspond to the first. The motion data can be obtained e.g. from the odometry of a vehicle system or from a motion estimate from multiple camera images.

In the same manner, the proposed method offers multiple advantages with this configuration. Thus, the blind area of the vehicle surroundings is temporally reconstructed, which manages without a place holder which would permanently overlay the blind area regardless of the vehicle surroundings to be displayed. In addition, due to the method which is in principle recursive, only a single first blind area image can be retained and provided so that significant storage resources can be saved in e.g. a storage unit and/or a data processing unit. Thus, the costs of providing a driving assistance system operated in accordance with this method can be reduced.

An advantageous further development provides that in the event that the determined new position of each first blind area pixel is determined to lie outside of the blind area, the respective second blind area pixel can be produced for the second time point by synthesizing each first blind area pixel on the basis of at least one captured camera image which is provided at the first time point. That is to say that, in this case, an already synthesized, e.g. rendered, image no longer serves as a basis for the further image synthesis, e.g. rendering, but instead a captured camera image of the vehicle surroundings. This likewise significantly saves storage resources since only a single camera image has to be retained and provided. If the vehicle has multiple vehicle cameras, e.g. one having a viewing direction from the vehicle front, one having a viewing direction from the rear of the vehicle and one each having a viewing direction from each lateral vehicle side, each vehicle camera can in each case provide its own camera image.

In a further embodiment, it can be determined on the basis of a motion vector obtained from the motion data of each first blind area pixel, from which individual vehicle camera from a multiplicity of differently arranged and/or aligned vehicle cameras, which each have different fields of view, the camera image used for the pixel synthesis is provided. Thus, a first blind area pixel which is moving into the field of view of a vehicle camera looking ahead of the vehicle, due to the vehicle motion, can, for example, be produced or respectively synthesized, e.g. rendered, on the basis of the one camera image of this vehicle camera.

Depending on the direction of motion of the vehicle, that is to say travelling straight ahead, reversing and/or cornering, the motion vector can be arranged in the respective field of view of a corresponding vehicle camera. That camera image of the respective camera, in the field of view of which the motion vector is arranged, can be selected to be provided.

In order to significantly save storage resources, it is advantageous if exactly one camera image or respectively an individual frame per existing vehicle camera is retained to be provided.

Regarding this, it can also be advantageous if exactly one blind area image for the first time point is retained to be provided.

In order to be able to reproduce a display image of the vehicle surroundings which is to be displayed e.g. on a screen of the vehicle, a second blind area image produced or respectively synthesized, e.g. rendered, from the respective second blind area pixels for the second time point can be combined with at least one instantaneous camera image of the second time point. In this case, the fields of view are therefore represented by real-time camera images and the blind area is represented by the second blind area image for the instantaneous second time point.

In particular during the initial start of a device and/or driving assistance system operated in accordance with this method, the situation can occur that no first blind area image of the blind area yet exists. In order to hide the blind area, a display image to be displayed in the interior of the vehicle can then be displaced into the field of view of the respective vehicle camera, e.g. the front camera.

The method can be particularly advantageously deployed if the blind area is a ground level which is being driven on by the vehicle or respectively which is concealed by the vehicle body. Instead of a place holder, a synthesized, e.g. rendered, display image can then be displayed.

The method described above can be implemented e.g. in a control apparatus such as a control unit of the vehicle. The control apparatus can have a storage apparatus and a data processing apparatus.

A further aspect of the invention relates to a device for displaying vehicle surroundings in a vehicle during an instantaneous second time point. The device has:

At least one vehicle camera for detecting a corresponding field of view of the vehicle surroundings.

A storage apparatus, in which exactly one first blind area image is retained, which contains an image synthesis of a blind area of the vehicle surroundings, which blind area is arranged outside of the field of view, at a first time point preceding the second time point.

A data processing apparatus which is designed i) to arrange each first blind area pixel of the blind area in a new position estimated for the second time point, ii) to determine whether the new position of each first blind area pixel at the second time point still lies within the blind area, and iii) to produce a respective second blind area pixel for the second time point by motion compensating each first blind area pixel on the basis of motion data of the vehicle if the new position is determined to lie within the blind area.

The device can be further developed in accordance with the method described above and in particular offers the advantage that due to the procedure, which is in principle recursive, storage resources can be significantly saved.

The invention is in particular suitable as a driving assistance system for a vehicle, having a display apparatus arranged in the interior of the vehicle, such as e.g. a screen.

Figure 2A:
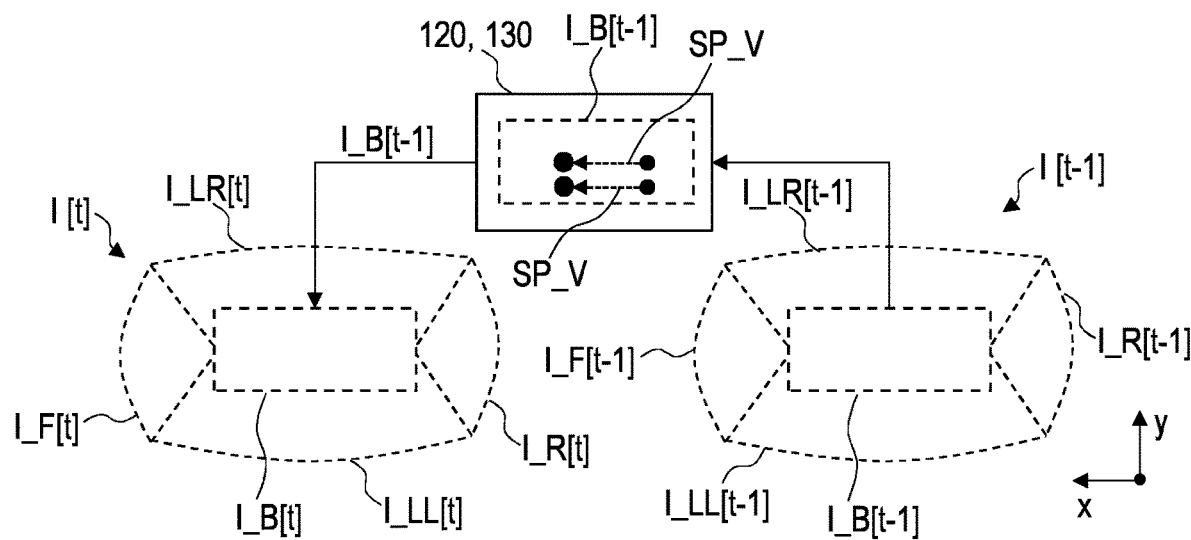
Figure 2B:
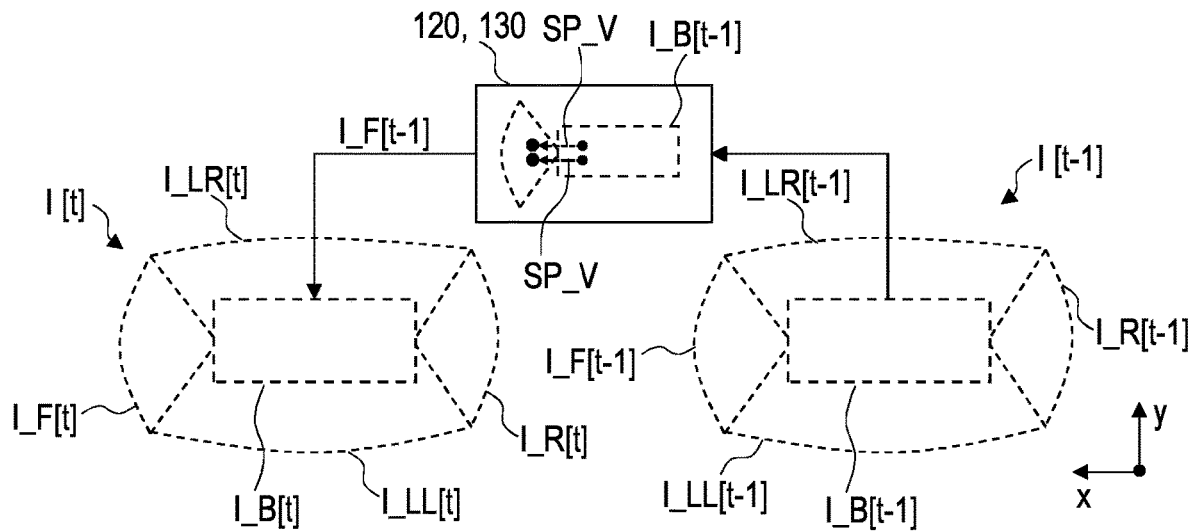
Figure 2C:
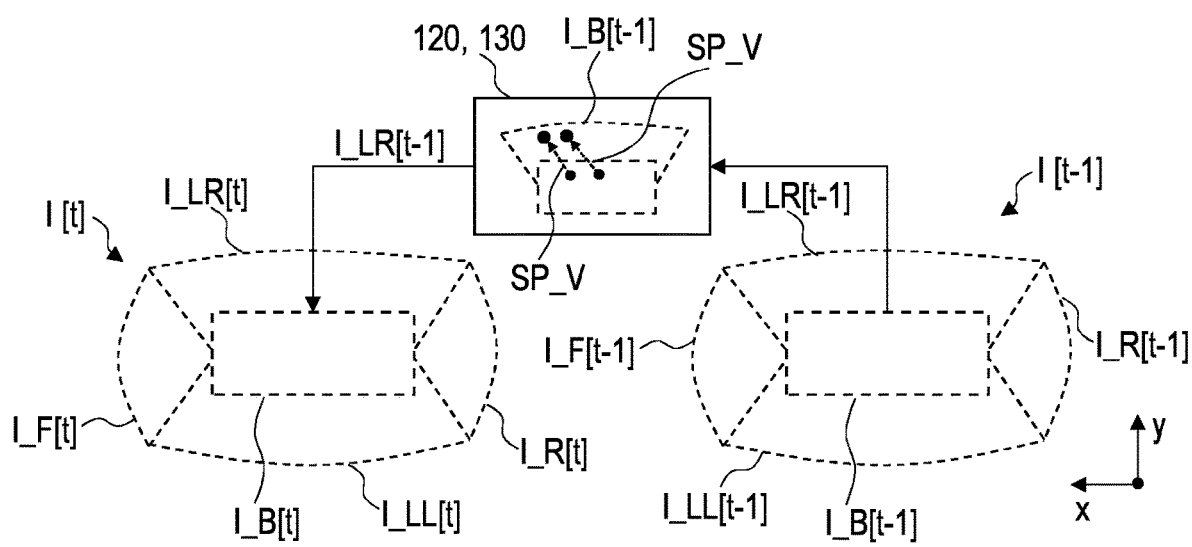
Figure 3:
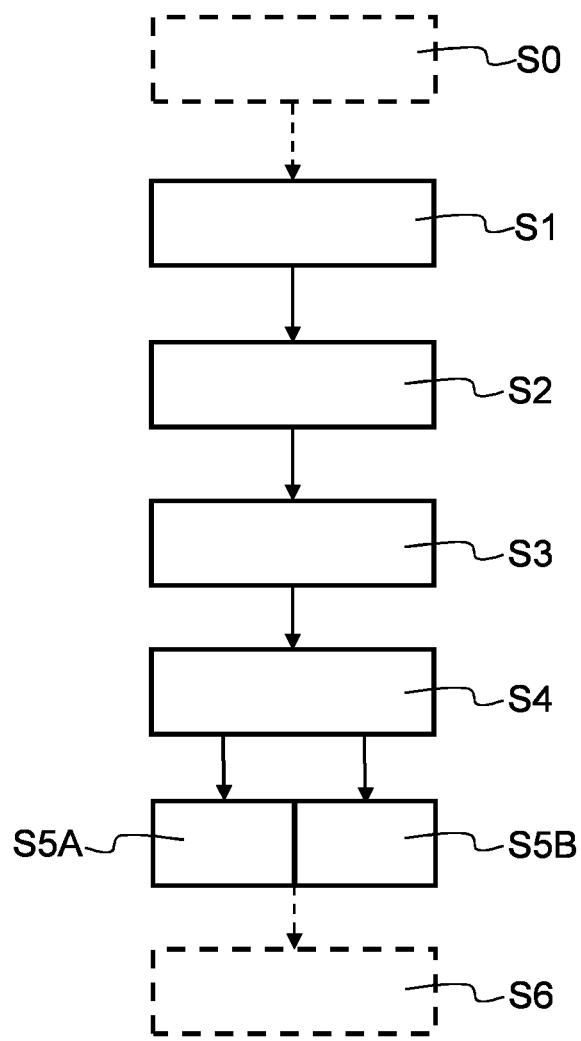

Advantageous embodiments of the invention are explained in greater detail below, with reference to the appended figures, wherein:

FIG. 1 shows a vehicle having a driving assistance system according to an aspect, which has a device for displaying vehicle surroundings according to a further aspect of the invention, FIG. 2A shows a diagram of the production of a blind area image, wherein a previous, synthesized blind area image serves as the basis, FIG. 2B shows a diagram of the production of a blind area image, wherein a previous, captured camera image serves as the basis, FIG. 2C shows a diagram of the production of a blind area image, wherein a previous, captured camera image serves as the basis, and FIG. 3 show a flowchart of a method according to a further aspect of the invention.

The figures are merely schematic representations and only serve to explain the invention. The same or similarly acting elements are consistently provided with the same reference numerals.

FIG. 1 shows a vehicle 1 standing on a ground level, which can substantially move in the directions x and y and which has a device 100 in the form of a driving assistance system or respectively a surround view system. This makes it possible for a vehicle passenger to have a panoramic view of the instantaneous vehicle surroundings displayed to him in the interior of the vehicle as a display or respectively pictorial reproduction.

To this end, the device 100 has a display apparatus 110 in the form of a screen, which is arranged in the interior of the vehicle 1 and visually represents a display image I. Moreover, the device 100 has a data processing apparatus 120 having at least one processor (which is not described in greater detail), which interacts with the display device 110, and a storage apparatus 130 which likewise interacts therewith. In addition, the device 100 has a multiplicity of vehicle cameras 140F, 140R, 140LL, 140LR which are mounted at different positions of the vehicle 1 and have different viewing angles or respectively fields of view 141F, 141R, 141LL, 141LR. Thus, the vehicle camera 140F is arranged on the vehicle front, the vehicle camera 140R is arranged on the rear of the vehicle, the vehicle camera 140LL is arranged laterally on the left and the vehicle camera 140LR is arranged laterally on the right. The fields of view 141F, 141R, 141LL, 141LR can be detected as the respective camera image I_F, I_R, I_LL, I_LR and are directly reproduced on the display apparatus 110 and, if applicable, are (temporarily) stored in the storage apparatus 130. For displaying, the camera images I_F, I_R, I_LL, I_LR are composed or respectively combined by the data processing apparatus 120 into the display image I (see FIGS. 2A-2C).

It is obvious from FIG. 1 that in the ground level, due to the vehicle 1 located thereon or respectively the body thereof, a blind area B is produced, which does not lie in any of the fields of view 141F, 141R, 141LL, 141LR and which cannot therefore be detected by any of the vehicle cameras 140F, 140R, 140LL, 140LR, since the body obscures the respective view. Consequently, no direct camera image can be reproduced for the blind area B as a blind area image I_B of the display image I on the display apparatus 110.

In order to nevertheless represent the blind area B with a substantially photo-realistic display in the form of the blind area image I_B on the display apparatus 110, the device 100 can be operated with the method described below on the basis of FIGS. 2A-2C and 3.

In principle, the vehicle surroundings are to be displayed on the display apparatus 110 substantially in real time at an instantaneous time point t, that is to say the display image I is to contain the vehicle surroundings at the instantaneous time point t. This is indicated below as well as in FIGS. 2A-2C by a time reference [t] in the reference numerals.

Accordingly, a first time point t−1 preceding the instantaneous second time point t is referenced in FIGS. 2A-2C with [t−1].

When the device 100 is initially started, the blind area B is hidden in the display image I of the display apparatus 110 in an optional step S0, by displacing the display image I of the vehicle surroundings so far into one of the fields of view 141F, 141R, 141LL, 141LR of the vehicle cameras 140F, 140R, 140LL, 140LR that the blind area B is thus hidden. The respective field of view 141F, 141R, 141LL, 141LR can be selected e.g. as a function of the motion direction x, y of the vehicle, the motion data thereof such as a vehicle speed v_x, v_y, the steering angle, the gear selection of the transmission, etc. To put it more simply, the display image I runs ahead of the actual vehicle surroundings at time point t e.g. by a vehicle length so that the blind area B is hidden. An initial blind area image I_B[t−1] can thus be stored and retained, which, instead of the blind area B, contains an image section of the respective camera image IF[t−1], IR[t−1], ILL[t−1], ILR[t−1].

In a step S1, the blind area image I_B[t−1] of the time point t−1 is then provided at the instantaneous time point t from the storage apparatus 130, which blind area image only contains the image content explained above in the first run-through following the initial start of the device 100, but which is constantly updated during operation as described below. If the vehicle 1 continues moving at e.g. 15 m/s in the x-direction, the image content of the blind area image I_B is updated with a corresponding image refresh rate and contains the image content at the preceding time point t−1 when it is provided for the respective instantaneous time point t.

In a step S2, each first blind area pixel IB_SP[t−1] of the blind area image I_B[t−1] is arranged by the data processing apparatus 120 in a new position estimated or respectively predicted for the instantaneous time point t by e.g. a transformation or similar, for which reason the motion data v_x, v_y of the vehicle 1 are in particular considered. These are made available e.g. by a vehicle system, e.g. a vehicle bus, or are determined from the camera images I_F, I_R, I_LL, I_LR. The new position can be estimated or respectively predicted e.g. by a suitable image processing method. If the vehicle 1 has continued moving at e.g. v_x=15 m/s in the x-direction, a corresponding motion vector SP_V is determined for each first blind area pixel IB_SP[t−1] and this is accordingly arranged as a second blind area pixel IB_SP[t] in its new position, as indicated in FIG. 2A.

It is then determined in a step S3 by the data processing apparatus 120 whether the new position of the respective blind area pixel IB_SP at the instantaneous time point t still lies within the blind area B. In the exemplary embodiment shown in FIG. 2A, a respective blind area pixel IB_SP shifted or respectively transformed by the motion vector SP_V still lies within the blind area B.

In this case, a respective second blind area pixel IB_SP[t] is produced, e.g. rendered, for the instantaneous time point t in the data processing apparatus 120, in a step S4, by motion compensating each first blind area pixel IB_SP[t−1], on the basis of the motion data of the vehicle 1 in a step S5A, i.e. in particular shifting it by the motion vector SP_V. As indicated in FIG. 2A for two exemplary blind area pixels IB_SP, this is repeated frequently until such time as each first blind area pixel IB_SP [t−1] is preferably arranged in its new position and a second blind area image I_B[t] is produced, e.g. rendered, therefrom, and is displayed in the display image I [t] in place of the blind area B. The second blind area image I_B[t] is then stored in the storage apparatus 130 and is provided in the next run-through of the method beginning with step S1 as a first blind area image I_B[t−1], which has been updated in terms of its content, for a further second time point t+n.

This can be generalized as follows:

$$I\_B[x, y, t] = I\_B[x+v\_x, y+v\_y, t-1],$$

wherein I_B is the blind area image, v_x and v_y are the motion data in the x- or respectively y-direction, t−1 is the first time point and t is the instantaneous second time point.

FIG. 2B shows another possible case of the determination in step S3, in which the new position of each first blind area pixel IB_SP[t−1] at the instantaneous time point t no longer lies within, but instead outside of the blind area B. Thus, in the exemplary embodiment shown in FIG. 2B, the respective blind area pixel IB_SP which has been shifted or respectively transformed by the motion vector SP_V lies in the field of view 141F of the vehicle camera 140F due to the motion of the vehicle in the x-direction.

In this case, the respective second blind area pixel IB_SP [t] for the instantaneous time point t is produced, e.g. rendered, in step S4, by synthesizing, e.g. rendering, each first blind area pixel IB_SP[t] on the basis of the captured camera image I_F[t−1] which is provided at the first time point t−1, in a step S5B.

FIG. 2C shows this case of the determination in step S3 using the example of cornering to the right, which comprises a motion both in the x- and y-directions having the motion data v_x, v_y. As shown in FIG. 2C, the respective blind area pixel IB_SP which is shifted or respectively transformed by the motion vector SP_V now lies in the field of view 141LR of the vehicle camera 140LR, due to the motion of the vehicle in the x-direction.

In this case, the respective second blind area pixel IB_SP [t] is produced, e.g. rendered, for the instantaneous time point t in step S4, by synthesizing, e.g. rendering, each first blind area pixel IB_SP[t−1] on the basis of the captured camera image I_LR[t−1] which is provided at the first time point t−1 in step S5B. As indicated in FIG. 2B for two exemplary blind area pixels IB_SP, this is repeated frequently until such time as each first blind area pixel IB_SP [t−1] is preferably arranged in its new position and a second blind area image I_B[t] is produced, e.g. rendered, therefrom, and is displayed in the display image I [t] in place of the blind area B. The second blind area image I_B[t] is then stored in the storage apparatus 130 and provided in the next run-through of the method beginning with step S1 as a first blind area image I_B[t−1] which has been updated in terms of its content for a further second time point t+n.

In steps S5B according to FIGS. 2B and 2C, the blind area pixel IB_SP[t] to be displayed is accordingly produced by an image synthesis, e.g. rendering, of a captured camera image I_F[t−1] or respectively I_LR[t−1] at time point t−1. This principle can of course be easily transferred to the remaining camera images I_R and I_LL.

This can be generalized as follows:

$$I\_B[x, y, t] = I\_F, I\_R, I\_LL, I\_LR[x+v\_x, y+v\_y, t-1],$$

wherein I_B is the blind area image, I_F-I_LR are the camera images of the vehicle cameras 140F-140LR, v_x and v_y are the motion data in the x- or respectively y-direction, t−1 is the first time point and t is the instantaneous second time point.

In an optional step S6, the display image I for the display apparatus 110 is then combined from the second blind area image I_B[t] and the instantaneous camera images I_F[t], I_R[t], I_LL[t], I_LR[t] of the second time point t.

FIG. 3 shows the method described above having the optional step S0, the steps S1-S5 as well as the optional step S6, which is once again summarized in a flowchart.

The invention claimed is:

1. A method for displaying vehicle surroundings in a vehicle during an instantaneous second time point, the method including:
providing a first blind area image, which contains an image synthesis of a blind area of the vehicle surroundings, which blind area is arranged outside of a field of view of a vehicle camera, at a first time point preceding the second time point, the first blind area image having a plurality of first blind area pixels,
arranging each first blind area pixel of the plurality of first blind area pixels of the blind area in a new position estimated for the second time point by considering motion data of the vehicle,
determining whether the new position of each first blind area pixel of the plurality of first blind area pixels of the blind area at the second time point still lies within the blind area, and
producing a respective second blind area pixel for the second time point by synthesizing each first blind area pixel of the plurality of first blind area pixels of the blind area on the basis of the motion data of the vehicle if the new position of each first blind area pixel of the plurality of first blind area pixels of the blind area at the second time point is determined to lie within the blind area.

2. The method according to claim 1, wherein the respective second blind area pixel is produced for the second time point by synthesizing each first blind area pixel on the basis of at least one captured camera image which is provided at the first time point if the new position is determined to lie outside of the blind area.

3. The method according to claim 2, wherein it is determined on the basis of a motion vector obtained from the motion data of each first blind area pixel, from which vehicle camera from a multiplicity of vehicle cameras, which each have different fields of, the camera image is provided.

4. The method according to claim 3, wherein the camera image of the respective camera, in the field of view of which the motion vector is arranged, is selected to be provided.

5. The method according to claim 3, wherein exactly one camera image per vehicle camera (is retained to be provided.

6. The method according to claim 1, wherein exactly one blind area image of the first time point is retained to be provided.

7. The method according to claim 1, further comprising repeating the arranging, determining, and producing the respective second blind area pixel until a second blind area image is produced from the respective second blind area pixels for the second time point, combining at least one instantaneous camera image of the second time point with the second blind area image, and displaying the combined image in the vehicle.

8. The method according to claim 1, wherein at the initial start a display image of the vehicle surroundings is displaced so far into the field of view that the blind area is hidden.

9. The method according to claim 1, wherein the blind area is arranged in a ground level which is driven over by the vehicle.

10. A device for displaying vehicle surroundings in a vehicle during an instantaneous second time point, having
at least one vehicle camera for detecting a corresponding field of view of the vehicle surroundings,
a storage apparatus, in which exactly one first blind area image is retained, which contains an image synthesis of a blind area of the vehicle surroundings, which blind area is arranged outside of the field of view, at a first time point preceding the second time point, the first blind area image having a plurality of first blind area pixels, and
a data processing apparatus which is designed
i) to arrange each first blind area pixel of the plurality of first blind area pixels of the blind area in a new position estimated for the second time point by considering motion data of the vehicle,
ii) to determine whether the new position of each first blind area pixel of the plurality of first blind area pixels of the blind area at the second time point still lies within the blind area, and
iii) to produce a respective second blind area pixel for the second time point by synthesizing each first blind area pixel of the plurality of first blind area pixels of the blind area on the basis of the motion data of the vehicle if the new position of each first blind area pixel at the second time point is determined to lie within the blind area.

* * * * *